Nov. 23, 1954
M. G. JACOBSON
ELECTRICAL SYSTEM FOR MEASURING
THE RATE OF MOTION OF A FLUID
2,694,928
Filed July 29, 1948
4 Sheets-Sheet 3
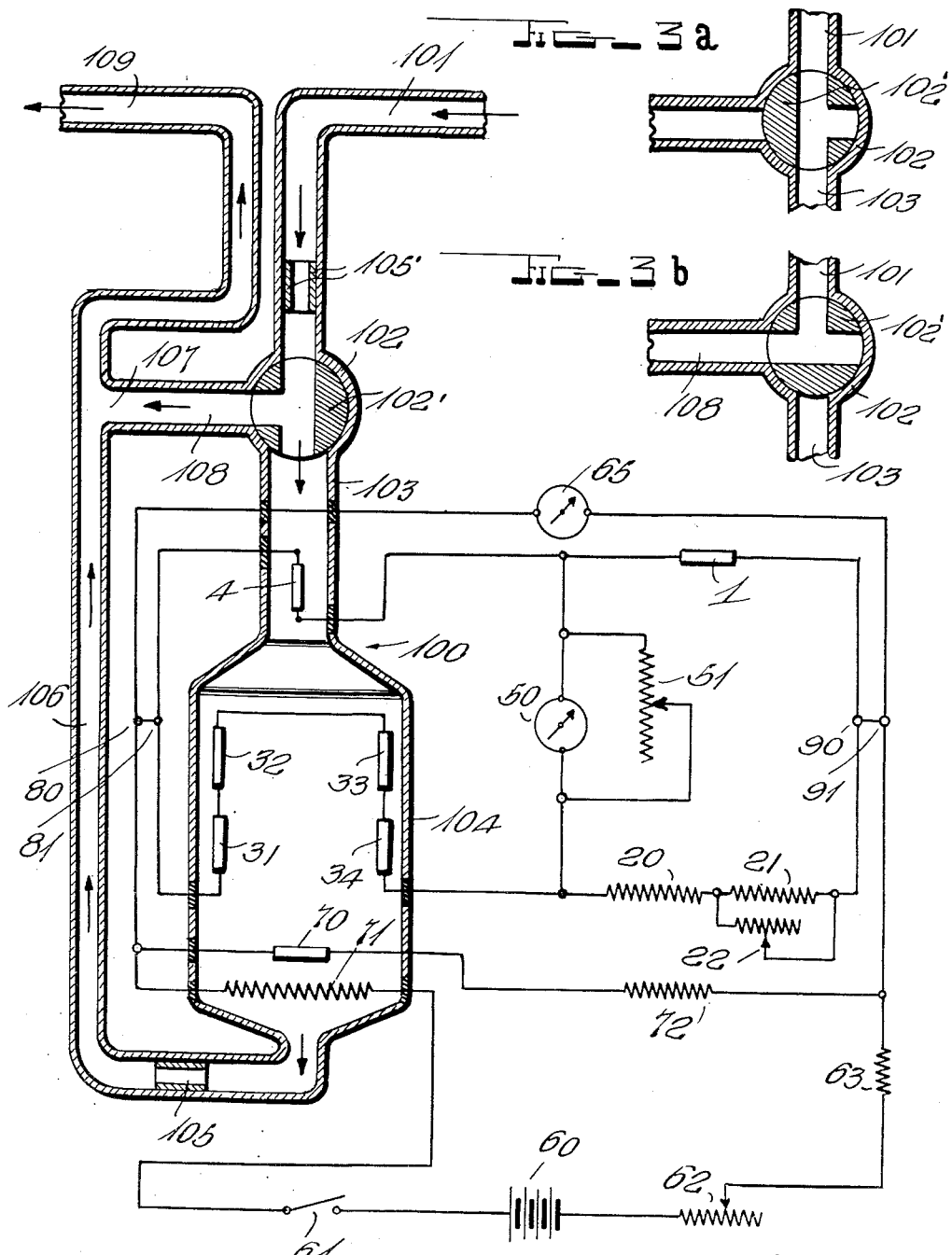

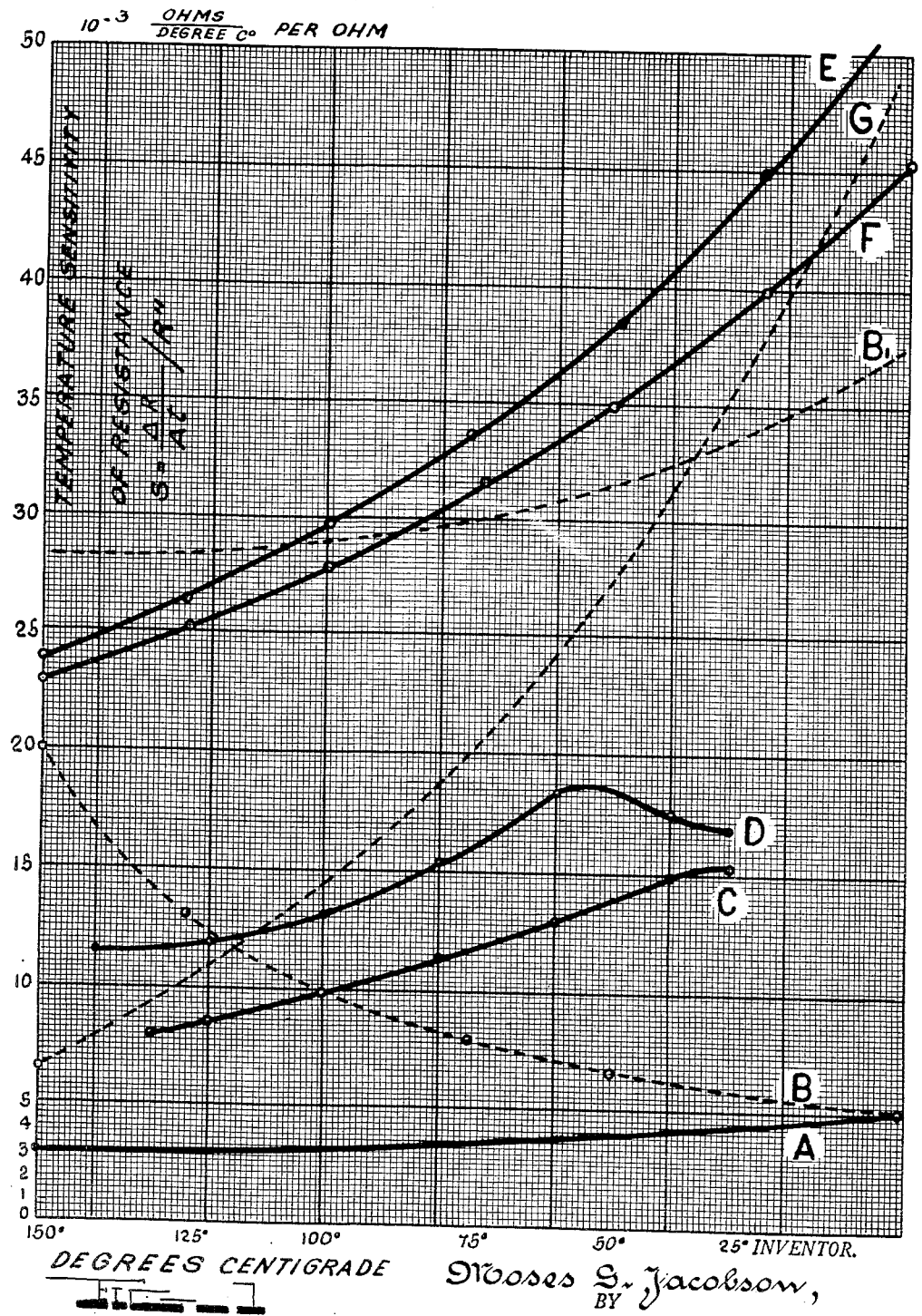

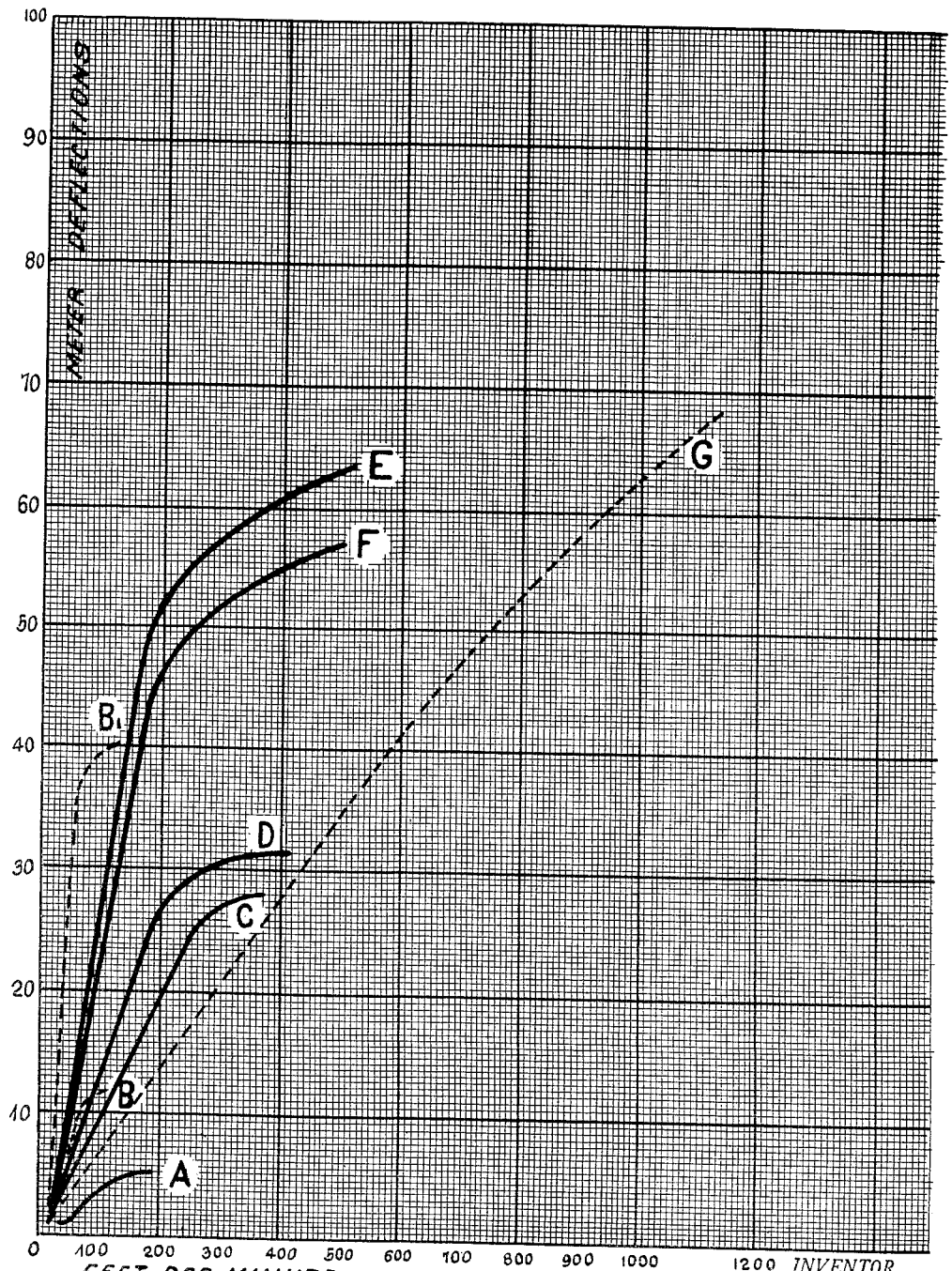

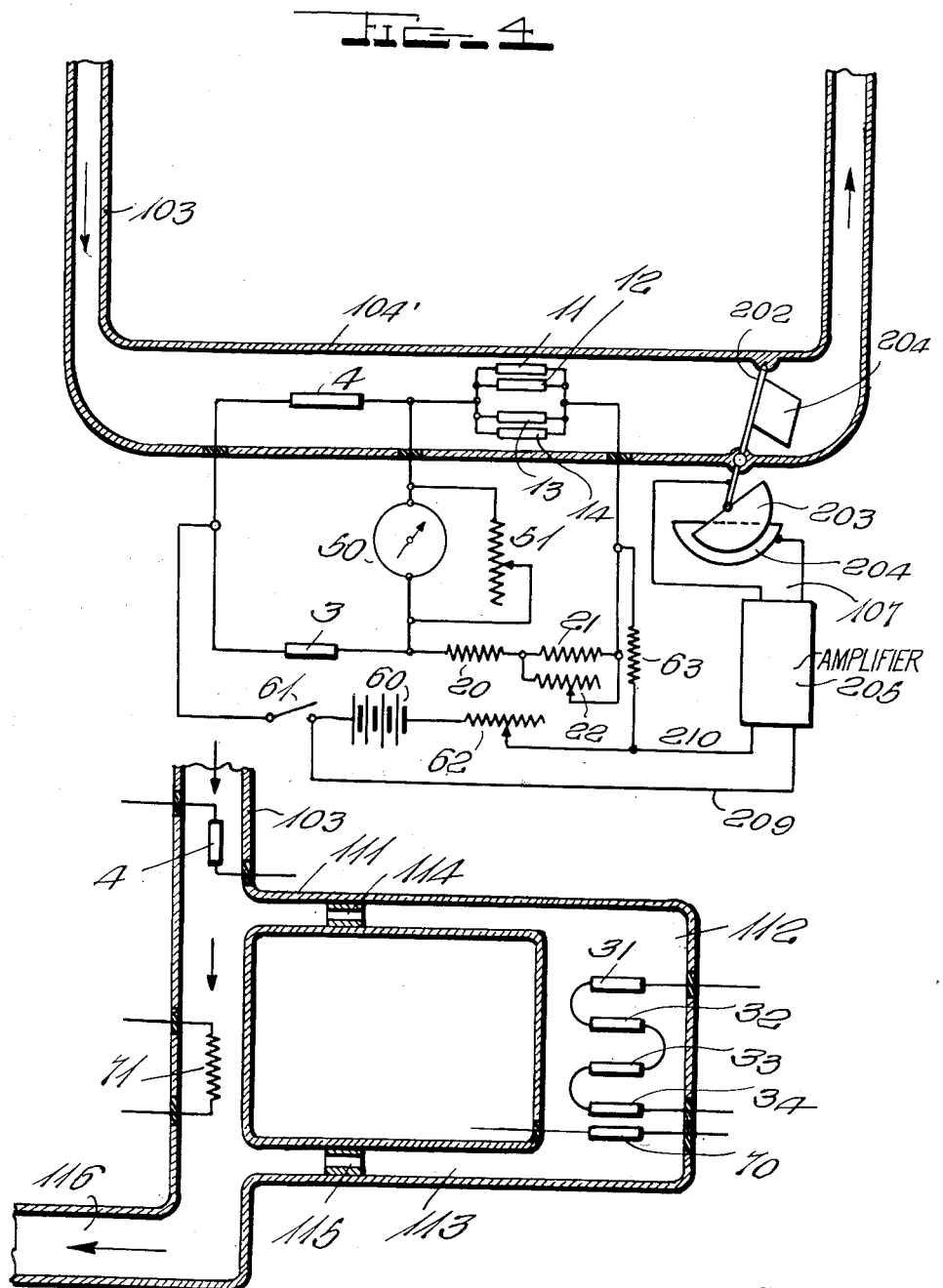

United States Patent Office 2,694,928
Patented Nov. 23, 1954

2,694,928

ELECTRICAL SYSTEM FOR MEASURING THE RATE OF MOTION OF A FLUID

Moses G. Jacobson, Verona, Pa., assignor to Mine Safety Appliances Company, Pittsburgh, Pa., a corporation of Pennsylvania Application July 29, 1948, Serial No. 41,347

6 Claims. (Cl. 73—204)

My invention relates broadly to measuring systems and devices for the measurement of the rate of flow of fluids by electrical means and more specifically by the method of observing the change in electrical resistance of an electrically heated conductor when cooled by the fluid flow.

One object of my invention is to define the conditions for thermally sensitive resistance elements which will provide the largest possible range in the measurement of the rates of fluid flow using a single instrument.

Another object of my invention is to provide a thermally sensitive resistance element which will combine high sensitivity with the smallest possible lag in indication.

Still another object of my invention is to provide in instruments of this class a close approach to a straight line calibration, combined with a large range of fluid flow rates.

A further object of this invention is to make the flow rate indications independent not only of changes in ambient temperature, but also of changes in the temperature of the fluid, whose flow is being measured.

Another object of this invention is to give the characteristics and conditions for resistance elements with negative temperature coefficients of resistance to make them usable as hot conductor fluid flow rate detectors.

Other and further objects of my invention reside in an improved flow system, in a novel combination of electrical circuit elements and in a novel arrangement of the electrical elements in the various parts of said flow system as set forth more fully in the specification hereafter following by reference to the accompanying drawings in which:

Figure 1 is a curve diagram illustrating the characteristics of temperature sensitive electrical resistors and showing the relative resistance temperature changes over a temperature range of from zero to 150° C. in a fluid flow system; Fig. 2 is a curve diagram illustrating the electric meter deflections obtained for the various resistors whose characteristics are depicted in the correspondingly lettered curves of Fig. 1; Fig. 3 illustrates the measuring system of my invention applied to an anemometer or flowmeter showing the temperature sensitive electrical elements arranged in the path of fluid flow and connected through a balanced Wheatstone bridge circuit with a measuring meter; Fig. 3a is a schematic view of the control valve of the anemometer or flowmeter moved to a position for controlling a flow range of from 20 to 500 feet per minute as compared with a flow range of from 400 to 4000 feet per minute with the valve in the position shown in Fig. 3; Fig. 3b illustrates the control valve moved to a position for suppressing the flow with respect to the electrical elements constituting the detector means for the purpose of checking the zero measuring base and adjusting the zero bridge voltage; Fig. 4 illustrates one form of means I provide for governing the power input to the detector element and/or to the balanced circuit substantailly in proportion to the fluid flow; and Fig. 5 illustrates an arrangement of compensator and range extender where the detector means is located in but part of the moving fluid that passes through the anemometer or flowmeter.

My invention is directed to an improved apparatus, and circuit arrangement, employing preferably thermally sensitive resistors, known under various names such as negative temperature coefficient resistors, thermistors, etc. They all belong to the class of semi-conductors and are made of oxides and sometimes sulfides of various metals; their most remarkable properties are as follows:

1. Their temperature coefficients of resistance are very large, for some of them as much as ten times higher than that of the highest known coefficient for metals. Hence, the resistance change produced by the same temperature change will be ten times higher for these materials than for the most sensitive metal element of the same resistance.

2. The temperature coefficient of resistance of these materials is negative; that is, while the electrical resistance of all pure metals and most alloys increases with temperature, the resistance of these elements decreases with temperature.

3. Their thermal resistance coefficient is not constant, but in most cases decreases considerably with temperature, while the coefficients of metals usually increase with temperature but slowly.

While the first of the above properties is ideal for use of these resistors as detector elements in flowmeters and anemometers of the hot conductor type, property 2 puts them somewhat at a disadvantage for this application: the sensitivity of resistance measurements in a Wheatstone bridge or a similar balanced circuit depends on the ratio of the temperature derivative of the resistance $dR/dt$ to the resistance R itself (that is on $dR/dt/R$), and thus, if the resistance coefficient has a constant negative value no matter how large, the absolute value of the sensitivity would rapidly decrease as the temperature of the detector element is decreased, when cooled by the moving fluid. This would result in a very short range for a flowmeter or anemometer using such an element (see curves B in Figs. 1 and 2), and the larger the absolute value of the resistance coefficient, the shorter the useful range would be, even though the sensitivity would be much higher.

Fortunately, according to the third property, the resistance coefficients of the semi-conductors are not constant, and in most cases decrease as the temperature goes up and increase as the temperature is lowered; moreover, in spite of the fact that their resistance increases with increased cooling (produced by fluid flow or otherwise), there are among these materials many, for which the absolute value of the ratio $dR/dt/R$ (which I shall call the temperature sensitivity of resistance) increases with cooling not only as much but considerably more than in the case of materials with positive resistance coefficients.

However, as my researches have established, to have the ratio $dR/dt/R$ increase as much or a little more, than in the case of metals, is not sufficient for a practical application of a semi-conductor as a flowmeter or anemometer. The prevailing conditions will best be explained with the aid of the accompanying curves: in Fig. 1 a number of curves are given showing the ratio $\Delta R/\Delta t$ to R plotted against temperatures from 150° C. to 0° C.; the quantity $\Delta R/\Delta t$ (that is the increment in resistance divided by the corresponding increment in temperature) is used instead of the derivative $dR/dt$, because, if $\Delta t$ is chosen small enough (say 1° C. or less), the results are identical for all practical purposes, yet the calculation work is considerably decreased. The temperatures are plotted in descending order, because in this way the picture corresponds to what is going on, when a resistor is heated to an initial high temperature and then cooled when exposed to a gradually increasing flow of fluid in which it is immersed. In Fig. 2 the deflections on an electric meter obtained for the various resistors of Fig. 1 are shown, when subjected under identical electrical and flow conditions to such gradually increasing fluid flow.

According to the most accepted terminology the temperature coefficient of resistance is defined as the resistance increment per degree centigrade divided by the resistance at 0° C., that is $\alpha = (R_t - R_o)/t/R_o$. However, frequently the ratio $dR/dt/R_t$ or $\Delta R/\Delta t/R_t$ is called the temperature coefficient of resistance and also is designated as $\alpha$. To avoid confusion I shall call the ratio $dR/dt/R_t$ or its practical equivalent $\Delta R/\Delta t/R_t$ the temperature sensitivity S of the resistance R at temperature $t$.

Curves A in Figs. 1 and 2 are for a metal wire having a positive coefficient of resistance $\alpha = +.005$, which is constant over the temperature range employed.

This metal, as may be seen from Fig. 2, does not make a satisfactory measuring element as a hot wire anemometer; and this is not because of the greatly curved response and the low sensitivity (or relatively low deflections), which could easily be amplified by electrical means, but mainly because the useable range of such an anemometer would be only from about 40 to 150 feet per minute, the curve flattening out right after 150 ft./min. and the increments becoming too small for measurement; it also should be noticed that the part where a linear scale would prevail is very small.

Curve B is for an imaginary semi-conductor element with $\alpha = -.005$ and remaining constant over the range of 0° to 150° C. As can be seen from Fig. 2, such a resistor would be impracticable for an anemometer or flowmeter since it would cover a range of only 25 to 75 ft. per min.

The resistors of curve $B_1$ will give no better results, although it will be noted that their $\alpha$ is not constant, but increases with falling temperature, sufficiently to make the temperature sensitivity of the resistance $S = dR/dt/R$ a function rising with decrease of temperature, as may be seen on Fig. 1.

Curves E and F are for semi-conductors and while they provide tremendous sensitivities (high deflections) they are not as good with respect to width of range as the resistors represented by curves C and D. Comparing curves E and F with C and D on Fig. 1, it will be seen that the slopes or steepness of these two groups of curves is not much different, yet Fig. 2 shows that curves C and D provide considerably wider useable ranges in an anemometer (or flowmeter). Thus, it becomes apparent that it is not the slope or steepness of the sensitivity curves alone that determines the useable range of the resistors as sensitive flowmeter elements. I have found that instead of the quantity $dS/dt$ (which gives the slope), it is the quantity—

$$\frac{1}{S}\frac{dS}{dt} = \frac{1}{S}\frac{d(dR/dt/R)}{dt} = \frac{R\frac{d^2R}{dt^2} - \left(\frac{dR}{dt}\right)^2}{R^2} \cdot \frac{1}{\frac{dR}{dt}/R} = \frac{\frac{d^2R}{dt^2}}{\frac{dR}{dt}} - \frac{\frac{dR}{dt}}{R}$$

which must fulfill certain conditions. In order to explain these conditions I shall refer to the basic physical principles involved in the operation of a hot conductor flowmeter. The resistance element of my hot conductor flowmeter inserted in the fluid medium is usually heated by electrical current, to a predetermined initial temperature at which the resistance reaches a certain value when the fluid is at rest. Usually at this point, the variable resistance element is balanced against one or more constant resistors included together with the variable element in a Wheatstone bridge or a similar network, and the electric indicating meter also included in the network is on zero. Consider, for example, that the variable resistor element is in this condition at a temperature of 125° C. and the fluid is set into motion. The cooling produced when the fluid just starts to move, will at a first approximation take place according to Newton's law, that is, it will be proportional to 125° C. — the temperature of the moving fluid; if the latter is 25°, for example, then the cooling at the start of the fluid motion will be proportional to 125°—25°; let it be assumed that the flow at first is 50 cc. per minute, and that it cooled the resistor to 110° C. and produced a deflection on the meter of 25 divisions. If the fluid flow is now increased to 100 cc. per minute, the cooling at the start of the increase will no longer be proportional to 125°—25°=100 but only to 110—25=85, and will further decrease as the flow increases. Hence, if the resistance element has a constant temperature sensitivity (S), the deflection for the second 50 cc. per minute will not be any more 25 but only of the order of 21.25 and the total deflection for 100 cc./min. flow will be only 46.25. As the flow is increased and the temperature of the sensitive resistance element approaches that of the fluid itself, the increments of the deflection become smaller and smaller, and the meter response curve bends over and approaches a line parallel to the abscissa axis. This operation very nearly follows curve A shown in Fig. 2.

However, if the resistance element has a temperature sensitivity of resistance that rises considerably with decrease of temperature, the decrease of the subsequent deflections is more or less counteracted, depending on how fast the rise takes place with relation to the initial sensitivity. If a material could be found that would have a curve similar to G on Fig. 1, then the ideal condition shown by curve G on Fig. 2 would be obtained; that is, the falling of the cooling factor would be fully compensated for by the increase of the temperature sensitivity for a very wide range of fluid flow. In this case, when the resistor is cooled down to 75° C., that is, to half way of the initial temperature difference between the resistor and fluid temperatures, the temperature sensitivity S of the resistor will have been doubled or increased by 100% of its original value.

At present there is no material known that even approaches the characteristics of the ideal curve G. Among the resistors that are available at present some may be chosen which will give, when incorporated in an anemometer or flowmeter, ranges, whose maximum (top of scale), will be at least five times that of the minimum (lowest accurate division). Curves C, D, E and F are representative of such resistors; curve $B_1$ is representative of a resistor, that is not satisfactory. The values of the temperature sensitivities of these resistors at 125° and 75° their increments and the percentage of these increments of the initial sensitivity values are given in the following table:

| Curve | $S_{125}$ ×10⁻³ | $S_{75}$ ×10⁻³ | $S_{125}-S_{75}$ ×10⁻³ | $\frac{(S_{75}-S_{125})\ 100}{S_{125}}$ |
|---|---|---|---|---|
|   |   |   |   | Percent |
| A | 3.08 | 3.64 | .56 | 18 |
| $B_1$ | 28.5 | 30.0 | 1.5 | 5 |
| C | 8.2 | 11.8 | 3.6 | 44 |
| D | 11.65 | 16.2 | 4.55 | 39 |
| E | 26.5 | 33.4 | 6.9 | 26 |
| F | 25.2 | 31.0 | 5.8 | 23 |
| G | 10.0 | 20.0 | 10.0 | 100 |

When the figures of the last column are compared with the curves of Fig. 2, it follows, that the higher the figure in the last column, the better the resistor is for a flowmeter or anemometer element.

In order to meet the requirement for a practically acceptable range width (having at least a 5 to 1 ratio of top to bottom) I have concluded from my research and tests, that the temperature sensitivity of a resistance element must have, when the resistor is cooled to the halfway temperature between its initial temperature and the fluid temperature, an increment which is at least 20% of the sensitivity at the initial temperature.

The temperature range of 150° to 0° has been chosen for the above explanations and illustrations because a good many semi-conductor type resistors, and among them those best suited for flowmeter applications, cannot be used above 150° C. However, the general theory and also the conclusions reached are the same for temperature ranges beginning at much higher temperatures.

I have developed additional ways and means both of an electrical and aerodynamical nature to increase the width of the useful range and the linearity of response which will be described hereinafter. But, first another phase of the invention will be described, without which the use of the semi-conductors for anemometers and flowmeters would have been impossible.

When the fluid is set into motion and the detector is cooled, the electric meter in the bridge circuit is deflected from its zero position to an extent depending on the fluid velocity. However, even if the fluid flow is instantly raised to a value, which then remains constant, it takes some time before the meter pointer comes to rest and a reading can be made. This lag in indication depends on the mass $m$ of the detector element, the area of its cooling surfaces $s$, the specific heat of the material $-c$, its, so-called, external heat conductivity $h$ (loss of heat per second through a unit of area of the external surface at a temperature gradient of 1° C.). The equation governing these quantities is:

$$h(T-\theta)s\Delta\tau = -cm\Delta T \tag{1}$$

when the body is cooled from an initial temperature T to $T-\Delta T$ in a time interval $\Delta\tau$ by a fluid whose temperature is $\theta$. From this equation it may be deduced that:

$$\frac{\Delta\tau}{\Delta T} = -\frac{cm}{hs}\frac{1}{T-\theta} \qquad (2)$$

From this it may be deduced that the time lag for the same amount of cooling at the same initial and fluid temperatures, will be proportional to the quantity:

$$\frac{cm}{hs} = \frac{cv\rho}{hs} = \frac{c\rho}{h}\frac{v}{s} \qquad (3)$$

where $v$ is the volume, $s$ the surface area, and $\rho$ the specific gravity of the conductor of mass $m$ used as the detector element.

I have compiled from tables the values for $c$ and $\rho$ (specific heat and specific gravity) for a number of materials of which the semi-conductors are made, and by forming the product $c\rho$ for each I have found that the values of $c \times \rho$ for these materials varies not more than 25% from an average value of .85 cal./cm.$^3$/°C.

The quantity $h$, which is a combination of the heat transfer coefficient from the solid to the fluid and the heat conductivity of the body, is exactly the same for all resistors of the same material. It might appear a priori that this quantity would vary considerably from one material to another. However, I have found in my experiments that resistors of the same size and shape and surface treatment made of different materials vary in the time lag of indications not more than 50% of an average. This is probably accounted for by the fact that the heat loss from the surface, when the surface is treated—as usually is the case—with the same kind of varnish and is immersed in the same fluid is dependent mostly on the heat transfer coefficient and only to a minor degree upon the internal heat conductivity of the material of the conductor. Thus, it becomes possible to treat the quantity $$\frac{c\rho}{h}$$

in Equation 3 to a first approximation as a constant, and to establish a maximum requirement for the dimensions of a semi-conductor, which is to be used as a detector element. I have found that when the ratio of the surface of a semi-conductor element exposed to the moving fluid to the total volume of the element is 20, when centimeters are used as unit of length area and volume or 50 when inches are used, a lag of the order of 30 seconds is obtained for the worst materials and of 15 seconds for the best. Since an anemometer or flowmeter with a lag over 30 seconds would scarcely be acceptable, the above ratio is considered as a lower limit. This limit or minimum requirement is independent of size, shape, material, etc., of the semi-conductor element used as a detector in a flowmeter, anemometer, or a similar application.

In case elements of the shape of cylindrical rods of radius $r$ are used, which are immersed lengthwise in the fluid stream the ratio $$\frac{s}{v}$$

reduces to $$\frac{2\pi r l}{\pi r^2 l} = \frac{2}{r} \text{ which must be } > \frac{20}{\text{cm.}} \text{ or } \frac{50}{\text{inches}}$$

Hence in this case $r$ must be less than 1 mm. or .040″ for an element with the best heat conductivity and considerably smaller (down to about .020″) for a material with the worst heat conductivity. This expression disregards the effect of the end areas of the rods but this is permissible because they are small relative to the side area, only one of them is active and their temperature is lower.

In planning the use of an element of a new material, since heat conductivities are mostly unknown and hard to measure, it is useful to remember that heat conductivities are closely related to electrical conductivities: for metals there is the well known relationship according to the law of Franz and Wiedeman; the investigations of the inventor has shown, that for semiconductors there is at least qualitatively a similar relationship, and that semiconductor materials with high electrical conductivities have also high thermal conductivities and vice versa. Hence, since the specific electrical resistance of a material is usually known or can be easily determined, it is possible to express the above rule for the minimum practical dimensions in a somewhat more specific form: namely, the ratio of surface to volume must be 20 or more (in centimeter units) and 50 or more (in inches) for material with the lowest specific electrical resistance, (highest electrical and heat conductivity) and must be respectively more than 40 or 100 for materials with the largest specific electrical resistance; obviously, for materials with specific resistances between said limits, the ratio must have a minimum value between the above two in accordance with the divergence of its specific resistance from the highest and lowest values.

Fig. 3 is a diagrammatic drawing of a preferred embodiment of the invention.

I arrange a hot wire or hot conductor anemometer or flowmeter as shown at 100 in Fig. 3 and provide circuit components external thereto and internal thereof as shown. Resistor element 1 is the first compensator which serves to keep the zero constant against voltage drifts and small changes in ambient temperature. The conductor (or semi-conductor) 4 which is to be used as a detector element is immersed as shown in the fluid whose motion is to be measured; it is wired into a Wheastone bridge or other balanced circuit as one of its arms with a group of similar resistor elements 31, 32, 33 and 34 connected with each other in series and in parallel with the detector element 4 and constituting a second compensator introduced for the purpose of compensating for the variations in calibration caused by temperature changes in the fluid whose flow is being measured.

The operation of the compensator 31–34 in the arrangement shown is based on the following facts:

(1) That each of the four elements receives only $\frac{1}{16}$ of the power supplied to the detector element, and therefore is heated only a few degrees above ambient:

(2) That they are located in a widened portion of the flow system and therefore subjected to a fluid flow which is much smaller than that around the detector, the fluid flow being substantially in inverse proportion to the area;

(3) That they are placed near the wall of the conduit, where the fluid flow is only a very small fraction of the flow near the axis, and (4) The elements 31–34, thus substantially not being cooled at all by the motion of the fluid, change their temperature only in concordance with the temperature variation of the fluid.

The anemometer or flowmeter 100 has an intake opening at 101 and discharge opening 109. The intake opening 101 leads through a valve housing 102 that houses control valve 102′ to intake 103 to the enlarged chamber 104 within which the temperature sensitive resistor elements 31, 32, 33 and 34 are immersed in the fluid flow. Detector element resistor 4 is located in the intake 103. The discharge end of the chamber 104 leads through a restriction 105 to the discharge pipe 106. A by-pass pipe 108 leads from the valve housing 102 to the discharge pipe 106 and connects thereto at 107 from which a conjoint discharge pipe leads to the discharge opening 109. The Wheastone bridge circuit in addition to the above described three temperature sensitive resistor arms 4, 1, and 31 to 34, contains a fourth arm made up of substantially temperature insensitive resistors 20, 21, and 22; resistor 22 is adjustable and serves to adjust the bridge to balance. Further the circuit contains a battery or another power supply 60, and a sensitive electrical meter 50 to indicate balance and degree of out of balance, a rheostat 62 in the power supply line to control the current through and/or voltage applied to the entire balanced circuit and thus also to the detecting conductor. By means of an additional meter 65, or a switch with additional resistances and circuit connections to meter 50 (not shown on drawing), the voltage applied to the conductor can be measured, and by means of the rheostat adjusted to a predetermined value, at which the conductor used as a detector element is at a predetermined initial temperature. The indicating meter 50 is provided with an adjustable shunt 51 therearound. In parallel with the Wheastone bridge proper is a negative temperature coefficient resistor 70 with a constant resistor 72 in series, and between the power supply 60 and the bridge arms is a positive temperature coefficient resistor 71 and a constant resistor 63. The temperature sensitive resistors 70 and 71 are placed in the path of the moving fluid. Their destination and mode of operation is described in detail in column 8 below in the paragraph beginning with the words "It was explained hereinbefore . . . ." Electrical connections are established to the immersed resistors 4, 31, 32, 33 and 34 and resistors 70 and 71 through circuit path 80—81. The opposite portion of the Wheatstone bridge circuit connects through circuit path 90—91 as shown.

One of the methods used in the system of my invention to further extend the scale range from a 5 to 1 top to bottom ratio is based on the following: It is known that the so-called velocity pressure, which is the pressure differential between the impact pressure and the static pressure as measured in a Pitot-static tube combination is proportional to the square of the fluid velocity. That is, if we plot the velocities as abscissae and the corresponding pressure differentials obtained on a sensitive manometer connected to a Pitot-static tube combination as ordinates, a curve is obtained which is convex to the abscissa axis and slopes upward. According to this invention the sensitive detector element consisting of a negative temperature coefficient conductor, designated by the numeral 4 on the drawings, is placed not directly in the fluid flow to be measured but inside a Pitot-static tube combination the openings of which 101 and 109 are placed substantially in line or fluid flow with the opening 101 facing the flow and the opening 109 turned away from it 180°. Although in distinction from an actual Pitot-static tube, there is now a small part of the fluid flow going through the tubes past the detector element, but this flow is still substantially proportional to the square of the fluid velocity to be measured. The detector elements of hot body flowmeters have by themselves response curves of a character shown in Fig. 2: they are convex to the abscissa axis and slope downward. Placing the detector element inside the Pitot-static tube gives a combination of these two characteristics, and depending on the downward slope of the resistor element on one hand, and on the other hand on the amount of flow, that is diverted from the main flow through the Pitot tube (which can be controlled easily, for example, by means of restrictions, such as 105 and 105') the ultimate response curve can be more or less straightened until a substantially straight line characteristics over as wide a range as 10 to 1 and even 15 to 1 is obtained.

Since the relationship between the fluid flow and the pressure differential between the two sides of an orifice plate or a Venturi tube is substantially the same as for a Pitot tube, the Pitot tube can be replaced by a tube containing a plate with a suitable orifice or a Venturi tube; the detector element and some of the compensator elements are placed in a tube connected to both sides of the orifice plate or the Venturi tube, and the flow through the latter tube made small by one or more restrictions. In general, it will be recognized that the main requirements for this arrangement are: to have the main fluid flow to be measured pass through a device or means which produces a pressure differential that is proportional to a higher power than one of the flow, to locate the detector element in place of the manometer, and to restrict the flow past the detector to a value, which is small enough not to disturb much the above pressure-flow relationship.

This arrangement, moreover, provides an easy and convenient means of adding a second (and if desired a third and more) measuring range for very much higher flows: in the position in which the three way valve 102' is shown on Fig. 3 part of the flow through the Pitot-static tube is diverted through a by-pass 108, permitting only a predetermined part, such as ⅕ or ⅒ of the flow to go past the detector.

In one of the embodiments of my invention that I have built, using the valve in the position shown in Fig. 3a, a flow range from 20 to 500 feet per minute is covered, while with the valve in the position of Fig. 3, a range from 400 to 4000 is covered. With the valve in position 3b, any flow is kept away from the detector element; this is used for zero checking and adjustments of the zero and of the bridge voltage.

In some cases, as for example, when extremely low flows are to be measured, it is desirable to place the detector element directly in the main flow. Also, further extension of the measuring range above that provided with the Pitot-static tube combination is sometimes desirable. For these purposes, I have developed a purely electrical method of extending the range and straightening the response curve. This method can be used by itself, without the Pitot-static tube, as in the aforementioned case, when the Pitot-static tube is not desirable, or it may be used in combination with it as in the preferred arrangement shown in Fig. 3.

It was explained hereinbefore why the response curve of a hot body flowmeter is sloping downward: substantially the reason is that as the cooling produced by the flow proceeds the temperature differential between the temperatures of the resistor and of the fluid decreases, and thus the rate of cooling becomes smaller and smaller; however, if means sensitive to flow be provided in the circuit, which will increase the electric power delivered to the detector element or both to the entire balanced circuit and to the detector element included in it, as the fluid flow increases and substantially in proportion thereto, if the amount of this increase is properly adjusted, either by subjecting this flow sensitive means only to a definite fraction of the fluid flow or by regulating the additional power supply by purely electrical means such as resistances, rheostats, etc., or both, then the decrease of the cooling rate can be fully and exactly compensated by progressively increasing the temperature of the detector as the flow and its action on the detector increases. One way of accomplishing this is to include in the electric circuit of Fig. 3 a negative temperature coefficient resistor 70 in parallel with the Wheatstone bridge and/or a positive temperature coefficient resistor 71 in series with the bridge, and place both of these, or either of them, in a widened part of the flow tube, which also holds the detector element. In the wider parts, the linear velocity of the fluid and the cooling produced by it will be lower. Additional decrease of the effect of elements 70 and 71 are provided by the resistors 72 and 63. The way this arrangement works is as follows: as the flow increases, the resistance 71 in series with the bridge is decreased; therefore, a larger portion of the total voltage available will be applied to the bridge and also to the detector element.

As a result increments of deflection for the subsequent flow increases will be substantially increased due both to the increased bridge voltages and the higher detector temperatures.

When the flow increases the parallel resistor 70 due to its negative coefficient is increased in resistance. This causes the current in the bridge circuit which is in parallel to it to increase, and to accomplish a net result similar to that from the action of the positive resistor in series.

Other means which are adapted to vary the power input to the detector element and/or to the balanced circuit substantially in proportion to the fluid flow may be used, such as, for example, those shown in the modification of Fig. 4. Here in the flow tube 104' containing the compensator element consisting of the high temperature coefficient resistors 11, 12, 13 and 14 a vane 201 is also installed, which is more or less deflected by the fluid flow from the normally vertical position. To the continuation of the spindle 202 of this vane 201, protruding through the wall of the pipe one or more rotary elements 203 of a variable condenser are connected. The flow thus changes the relative position of the rotary plates 203 with respect to the stationary plates 204. The resulting change in capacity activates amplifier 205 to deliver an increased amount of power through output leads 209 and 210 to the bridge circuit.

Similar reference characters have been used to designate corresponding parts of the Wheatstone bridge circuit heretofore illustrated in Fig. 3 in order to show the relationship of the temperature sensitive resistors, the regulating vane and the components of the balanced bridge system.

When using this device as an anemometer, that is to measure the velocity of air surrounding the observer as well as the instrument, it is ordinarily sufficient to employ the usual means of temperature compensation, consisting of a resistor identical to the one used as a detector element and placed in an adjacent bridge arm, such as resistor 1 on Fig. 3, connected in series with the detector, or resistor 3 on Fig. 4 connected in parallel with the detector. In this case the fluid, that is, air, is supposed to have the same temperature as all the ambient air and the compensator being in the same ambient air will assume a higher or lower temperature corresponding to the temperature of that air, and thereby when the bridge is being balanced have the detector also adjusted to the prevailing change of ambient temperature. However, if the device is used as a flowmeter, then the moving fluid may have a temperature quite different from the ambient temperature. In order to compensate for the changes in fluid temperature I provide a second compensator: this consists in the preferred embodiment of Fig. 3 of several negative temperature coefficient resistors 31, 32, 33 and 34, of substantially the same resistance and resistance temperature characteristics as the detector 4 and first compensator 1; they are connected in series to each other and the entire group in parallel with the detector element 4, and they are inserted also in the fluid flow preferably where the latter is not large. It is apparent that at bridge balance and for the relatively small unbalance currents used, the total voltage of all four of the resistors equals the voltage of the detector element 4 when the bridge is balanced and the current through four elements in series being less than ¼ receive only about 1/16 of the power. That is to say the applied voltage to the resistors as a group and to resistor 4 are equal though the voltage drop or change in potential across each resistor may be ¼ that across resistor 4. Therefore, they will be heated by the electric current only slightly. If now the fluid temperature is higher than the one at which the original calibration was made, these resistors will be heated, their resistance will decrease, and this will cause the detector to be also at a lower resistance, that is, at a higher temperature, when the bridge is adjusted to balance. Thus, the difference in temperature between the detector and the fluid will be maintained substantially the same as at the original calibration irregardless of what the fluid temperature will be—within certain limits. The calibration is substantially determined by this temperature differential, rather than by the absolute temperatures.

In the modification of Fig. 4 the second compensator, that is the one for fluid temperature variation, is placed in series with the detector element and also is inserted in the fluid stream. The four individual elements 11, 12, 13 and 14, which make up this compensator, are connected in parallel with each other, as required by the Wheatstone bridge theory. It follows from the bridge theory that, in this modification, at balance, to the right side arms of the bridge a smaller voltage will be applied than to the left side arms, the combined resistance of resistors 11–14 in parallel being equal to ¼ of the resistance of one of them. The applied voltage to the resistors as a group and to resistor 4 are equal though the voltage drop or change in potential across each resistor may be ¼ that across resistor 4. In this case each of the elements 11, 12, 13 and 14 passes about ¼ of the current passed by detector 4, and thus again receives only about 1/16 of the power, and is heated only very little.

It will be apparent to those familiar with this art that in place of the several resistors used in this second compensator, a single resistor of larger size or of a very much different material can be used, the substantial requirement being that these compensator elements should not be heated appreciably by the bridge currents. However, in view of the time lag and other practical considerations I have shown in the preferred arrangement several small size resistors of the same general characteristics as the detector 4 and first compensator 1 or 3.

Fig. 5 shows a variation in which the second compensator and the range extender 70 are placed in a side pipe 112, instead of in an enlarged continuation of the pipe containing the detector. Thus, these elements are located in but part of the moving fluid. The anemometer or flowmeter illustrated in Fig. 5 is divided into two portions by providing a parallelly extending branch pipe 112 adjacent the pipe 103. The fluid flow enters pipe 103 in which resistor 4 is located and passes through branch pipe 111 with restriction 114 therein to the side pipe 112 returning to branch pipe 113 containing restriction 115 which connects to the discharge pipe 116. The fluid flow path may thus follow the path from inlet 103 to discharge pipe 116 or the path through branch pipe 111, side pipe 112 and branch pipe 113 to discharge pipe 116. The compensator elements 31, 32, 33 and 34 and the range extender elements 70 located in the side pipe 112 are acted upon by part of the moving fluid diverted in the flow path from inlet pipe 103 to discharge pipe 116. The positive temperature coefficient resistor 71 is located in the main flow path of inlet pipe 103 and discharge pipe 116. The electrical circuit connections are as heretofore set forth in the circuit of Fig. 3.

I have found the measuring system of my invention highly practical and efficient in operation and while I have described my invention in certain of its preferred embodiments I realize that further modifications might be made and I desire it to be understood that no limitations upon my invention are intended except as may be imposed by the scope of the appended claims.

What I claim as new and desire to secure by Letters Patent of the United States is:

1. In a device for measuring the rate of motion of a fluid, a source of electric power, a number of electrical resistors with high temperature coefficients connected in the arms of a balanced electric circuit and at least one of said resistors being heated to a predetermined temperature and exposed to the motion of a part of said fluid, said balanced circuit including means for indicating the degree of unbalance caused by a change in resistance of its arms, and a variable electric circuit element controllable by fluid velocity exposed to a part of said fluid motion that is being measured, and electrical circuit connections between said variable circuit element and said source of electric power and between said variable circuit element and said balanced electric circuit, the coefficient of resistivity of said variable circuit element being selected so that the electric power from said source delivered to the said balanced circuit is increased when the rate of fluid motion is increased.

2. In a device for measuring the rate of motion of a fluid, a conduit for the passage of fluid, a source of electric power, a balanced electric circuit connected with said source and including means for indicating the degree of unbalance produced by resistance changes of its elements and including also a number of resistors located in said conduit with high temperature coefficients and connected with said balanced electric circuit, at least one of said resistors being heated by the current from said source to a predetermined temperature and exposed to the motion of a part of said fluid, and a negative temperature coefficient resistor within said conduit but outside of said balanced electric circuit and connected in parallel to said balanced electric circuit and heated to a temperature above ambient and exposed to a part of said fluid moving with velocities that are substantially proportional to the fluid motion to be measured.

3. In a device for measuring the rate of motion of a fluid, a conduit for the passage of fluid, a source of electric power, a Wheatstone bridge electrical circuit comprising resistors constituting arms connected with said source, means connected with said resistors for indicating balance and the degree of unbalance, said resistors including negative temperature coefficient resistor means located in said conduit and disposed in one arm of said bridge circuit and heated at balance to a predetermined temperature and exposed to the fluid motion and similar resistor means disposed in an adjacent bridge arm and located in said conduit in longitudinally spaced relation to the first mentioned resistor means and heated by the electric current from said source to a negligibly small amount and exposed to a part of the fluid whose motion is to be measured, and a positive temperature coefficient resistance disposed adjacent said last mentioned resistor means and exposed to the flow of fluid through said conduit and electrically connected in series between said power source and said Wheatstone bridge circuit.

4. In a system for measuring the rate of motion of a fluid, a conduit for directing the flow of a fluid, a temperature sensitive detecting resistor located in one portion of said conduit, a number of temperature sensitive resistors each variable in effective resistance in accordance with the temperature thereof located in another portion of said conduit spaced away from the aforesaid resistor and submerged in the path of fluid flow, a balanced electrical circuit including a potential source and having separate arms one of which includes said first mentioned temperature sensitive detecting resistor and another of which includes said number of temperature sensitive resistors, and means for indicating changes in effective values of the resistances of said resistors according to temperature change thereof produced by motion of fluid flowing around said resistors, and a variable electric circuit element located in a portion of said conduit and controlled by the motion of the fluid therethrough, and connections between said variable circuit element and said power supply and between said circuit element and said balanced electrical circuit, the coefficient of resistivity of said last mentioned circuit element being selected to produce an increase in the effective potential impressed upon the balanced circuit when the rate of motion of the fluid is increased.

5. In a device for measuring the rate of motion of a fluid, a source of electric power, a balanced electrical circuit having a multiplicity of balancing arms comprising an electrical resistor of high temperature coefficient connected in one of said arms of said circuit and a number of electrical resistors with high temperature coefficients connected in another of the arms of said circuit, at least one of said resistors being heated to a predetermined temperature and exposed to the motion of a part of said fluid, said balanced circuit including means for indicating the degree of unbalance caused by a change in resistance of its arms, and a variable electric circuit element controllable by fluid velocity, exposed to a part of the said fluid motion whose rate is being measured, and electrical circuit connections between said variable circuit element and said source of electric power and to said balanced electrical circuit, the coefficient of resistivity of said variable circuit element being selected for providing an increase in power supply to and in the heating of said last mentioned one resistor when the rate of fluid motion is increased.

6. In a device for measuring the rate of motion of a fluid, a conduit for confining the flow of fluid, resistance elements having high temperature coefficients disposed in longitudinally spaced positions in the flow path of the fluid in said conduit, a source of electric power, a balanced electric circuit connecting said elements and including means for indicating the degree of unbalance produced by resistance changes of said elements, at least one of said resistance elements being heated by current from said source to a predetermined temperature, and a positive temperature coefficient resistor connected in series between said power source and said balanced circuit and disposed in a further longitudinally spaced position with respect to the aforesaid resistance elements and heated above ambient temperature and exposed to a part of the fluid moving through said conduit.

References Cited in the file of this patent

UNITED STATES PATENTS

| Number | Name | Date |
|---|---|---|
| 790,888 | Ferris | May 30, 1905 |
| 1,254,871 | Wilson | Jan. 29, 1918 |
| 1,291,489 | Hadaway | Jan. 14, 1919 |
| 1,691,600 | Brush et al. | Nov. 13, 1928 |
| 2,009,427 | Bentzel | July 30, 1935 |
| 2,067,645 | Pinkerton | Jan. 12, 1937 |
| 2,297,408 | Hardebeck | Sept. 29, 1942 |
| 2,315,185 | Boyle | Mar. 30, 1943 |
| 2,322,018 | Huber | June 15, 1943 |
| 2,324,606 | Wagner | July 20, 1943 |
| 2,437,449 | Ames et al. | Mar. 9, 1948 |
| 2,509,889 | Shockley | May 30, 1950 |
| 2,552,017 | Schwartz et al. | May 8, 1951 |
| 2,580,182 | Morgan et al. | Dec. 25, 1951 |

FOREIGN PATENTS

| Number | Country | Date |
|---|---|---|
| 508,511 | Germany | Sept. 29, 1930 |

OTHER REFERENCES

Article, Thermistors, Their Characteristics and Uses, G. L. Pearson in the Bell Lab. Record, pp. 106–111, December 1940.

Article, Thermistors in Electronic Circuits, Ralph R. Batcher, in Electronic Industries, January 1945, pp. 76–80.